US007542175B2

(12) United States Patent
Schutte, III

(10) Patent No.: US 7,542,175 B2
(45) Date of Patent: Jun. 2, 2009

(54) COMBINED FLEXOGRAPHIC AND INTAGLIO PRINTING PRESS AND OPERATING SYSTEM THEREFOR

(75) Inventor: Joseph B. Schutte, III, Harrison, OH (US)

(73) Assignee: Sekuworks, LLC, Harrison, OH (US)

( * ) Notice: Subject to any disclaimer, the term of this patent is extended or adjusted under 35 U.S.C. 154(b) by 765 days.

(21) Appl. No.: 10/508,849

(22) PCT Filed: Mar. 27, 2003

(86) PCT No.: PCT/US03/09267

§ 371 (c)(1),
(2), (4) Date: Sep. 24, 2004

(87) PCT Pub. No.: WO03/082574

PCT Pub. Date: Oct. 9, 2003

(65) Prior Publication Data

US 2005/0128525 A1 Jun. 16, 2005

(51) Int. Cl.

| | |
|---|---|
| ***B41C 1/02*** | (2006.01) |
| ***B41C 1/04*** | (2006.01) |
| ***G06K 15/00*** | (2006.01) |
| ***H04N 1/40*** | (2006.01) |
| ***H04N 1/403*** | (2006.01) |

(52) U.S. Cl. ...................................... 358/3.31; 358/1.5

(58) Field of Classification Search ......... 358/1.1–1.18, 358/400–498

See application file for complete search history.

(56) References Cited

U.S. PATENT DOCUMENTS

| | | | | |
|---|---|---|---|---|
| 3,878,517 | A * | 4/1975 | Kasubuchi et al. | 347/74 |
| 4,057,012 | A * | 11/1977 | Heidemann | 101/153 |
| 4,832,445 | A | 5/1989 | Haines et al. | |
| 5,033,378 | A * | 7/1991 | Ebihara | 101/152 |
| 5,447,335 | A | 9/1995 | Haslop | |

(Continued)

FOREIGN PATENT DOCUMENTS

DE 19527199 1/1997

(Continued)

OTHER PUBLICATIONS

Supplementary European Search Report for corresponding European application No. 03719475.0, dated Mar. 30, 2006.

*Primary Examiner*—Douglas Q Tran
(74) *Attorney, Agent, or Firm*—Fish & Richardson P.C.

(57) ABSTRACT

The invention encompasses the combination of two printing technologies into a single web fed printing press (10), particularly the combination of flexographic and intaglio printing. The present web fed printing press (10)comprises at least one flexographic printing module (14) equipped to apply variable amounts of motion and tension to a web of sheet material (11);at least one intaglio printing module (17) equipped to apply variable amounts of motion and tension to the web of sheet material (11)and means for controlling the amounts of motion and tension applied by the flexographic printing module or modules (14)and by the intaglio printing module or modules (17)to the web of sheet material(11). Preferably, the means for controlling the amounts of motion and tension applied to the web of sheet material (11)comprises a host processor (40) and first and second motion control processors (44, 45).

21 Claims, 2 Drawing Sheets

U.S. PATENT DOCUMENTS

| | | | | |
|---|---|---|---|---|
| 5,748,806 | A * | 5/1998 | Gates | 710/315 |
| 6,337,752 | B1 | 1/2002 | Heckenkamp et al. | |
| 6,765,704 | B2 | 7/2004 | Drinkwater | |
| 6,859,534 | B1 | 2/2005 | Alasia | |
| 2003/0231785 | A1 | 12/2003 | Rhoads | |
| 2005/0128525 | A1 | 6/2005 | Schutte, III | |

FOREIGN PATENT DOCUMENTS

| | | |
|---|---|---|
| EP | 0352483 | 1/1990 |
| EP | 1072408 | 1/2001 |

* cited by examiner

COMBINED FLEXOGRAPHIC AND INTAGLIO PRINTING PRESS AND OPERATING SYSTEM THEREFOR

DISCLOSURE OF THE INVENTION

The invention encompasses the combination of two printing technologies into a single web fed printing press 10, particularly the combination of flexographic 14 and intaglio 17 printing. Other features may be present in the combination web printing press 10 as well, such as die cutting, offset printing, gravure printing, hologram application, and the like. The aforementioned combining process is accomplished through the use of precision servo motors 35 coupled with motion control hardware 40 and software (Appendix). The computer-programs (Appendix) incorporated into this application were written by the inventor to accomplish the complex process of marrying two dissimilar printing processes in a single press.

The combination of two dissimilar printing processes is a complex problem of motion control. Web tension and position must be maintained throughout the printing process in order to achieve accurate print registration. The inventor has implemented precision control of the web using high accuracy servo motors 35 combined with low inertia drive rollers 25, 39, 42. A multi-processor motion control system 40 commands the activity of the servo motors 35 and monitors the resultant movement with digital position feedback. All solenoids, lights, and switches are interfaced to the press computer 40 using an integrated programmable logic controller.

The press controller 40 is comprised of a PC based computer using RISC based motion control boards. Each RISC based motion control board has its own processor, and supports up to eight channels of motion control. A single servo motor 35 defines a channel. Each point of web control uses a unique servo motor 35. Each motion control board runs a unique software program created by the inventor. The operator interface is driven by the host PC running Microsoft Windows and an application program (Appendix). This application program obtains information from the operator, converts it to machine commands, and passes it to the motion control boards via the PC back plane. It is the host PC application that coordinates the entire operation of the press 10, including programmable logic controller functions.

BEST MODE FOR CARRYING OUT THE INVENTION

Figure 1A:
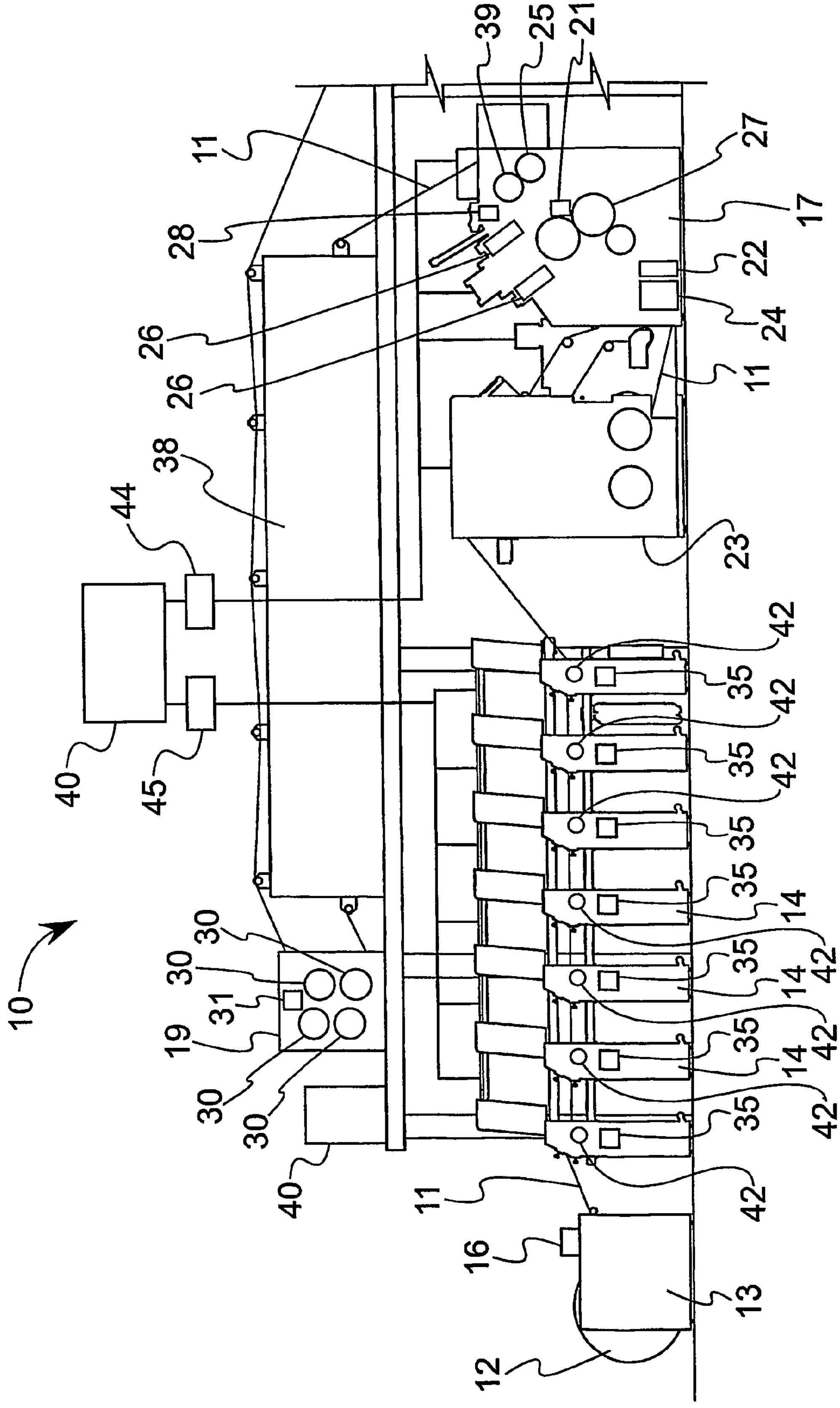
FIG. 1A is a diagrammatic side elevational view of flexographic and intaglio print units according to the present invention.
Figure 1B:
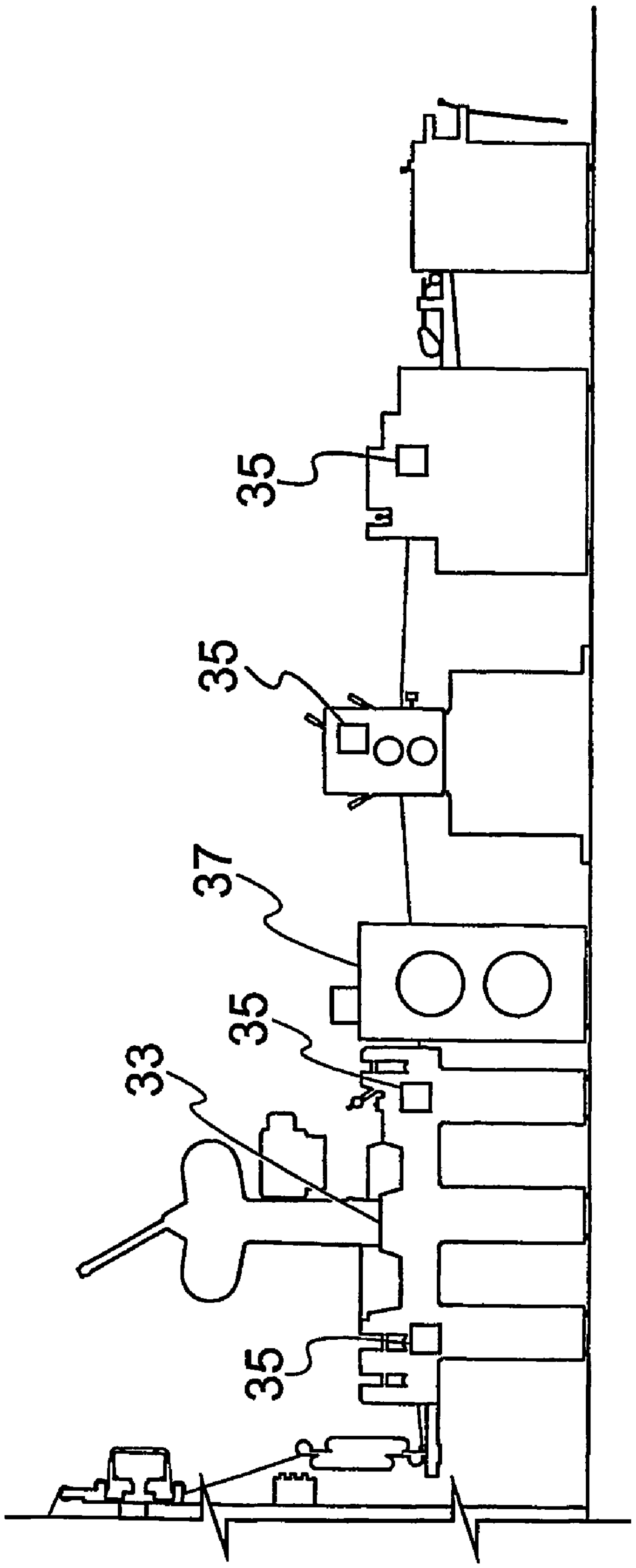
FIG. 1B is a diagrammatic side elevational view of optional finishing or processing units disposed downstream of the components shown in FIG. 1A.

As illustrated in FIGS. 1A and 1B, the present combination flexographic and intaglio printing press, generally designated 10, can be looked at as a multi-axis robot. Robots are thought to handle materials in an orderly way, moving them from one place to another, and performing operations along the way to alter the effect of the material. The press handles substrate or web material 11 wound in a roll 12, typically on a three inch cardboard core with an outside diameter of forty inches. The number of feet of material 11 on the roll depends on the type and thickness of the material being printed. The press is not limited to printing on paper; films, polymers, and the like are also suitable as a printing substrate 11. The width of the substrate or web 11 is a function of the design width of the combination press. An unwinder 13 acts as a delivery device for the substrate 11. The substrate 11 is pulled from the unwinder 13 by a first flexographic print unit 14 in the press line. The unwinder 13 includes a conventional tensioning mechanism 16 to provide resistance. The degree of resistance applied to the web by the unwinder 13 is adjustable, and regulated by a stand-alone tension controller.

All of the printers in the press line are flexographic print units 14. Preferably, the flexographic press units 14 precede the intaglio print units 17. One or more flexographic print units 14 apply ink to the substrate 11. The units' motion can be effected as a group with a single servo 35, or independently with a servo 35 for each print unit 14. The servo(s) 35 are controlled by a motion controller board 45 in the press computer 40. Since axis or unit numbers are generally assigned chronologically from the first unit in the line up, the first flexo 14, or group of flexo units 14 are assigned unit 1. This or these servos receive speed and position information from the motion controller 45. A reference signal to the motion controller(s) is derived from one of two sources: 1) in Flexo only mode, where the press is printing with the Intaglio unit disabled, the reference signal is synthesized from internal reference generator software, and 2) in combination mode, the reference signal is generated by an optical encoder 21 mounted on the intaglio unit drive 22. The motion controller 45 generates a command to the servo based on the reference signal generated and other parametric data such as operator data, print repeat length, and so on. Print registration (the alignment of one printed feature to another) can be adjusted by actions of the operator making entries to the host computer, which is translated to machine commands, and ultimately affects the command to the servo(s). The printed ink is dried at each flexographic print unit 14, typically with hot air or ultraviolet light. Operator pushbuttons at the unit(s) 14 connect to the integrated PLC. Each action at one or more of the pushbuttons is evaluated by the integrated PLC in the host computer 40 which gets translated to machine commands, resulting in appropriate action by the motion controller(s) 44, 45.

The intaglio unit 17 generally follows the flexographic print unit(s) 14. The press will include one or more intaglio print units 17 and contain one or more inking units 23 each. Intaglio units 17 also include some form of wiping system 24 to remove excess ink applied to the plate. The intaglio unit(s) may also contain a prewipe system that removes excess ink from the plate. Each of the subsystems within the Intaglio unit(s) is controlled by the integrated PLC. Multiple servos coordinate the movement of paper through each intaglio unit.

When the press operator selects the operating mode of flexographic only, which may include other units on the press such as the aforementioned ones, the intaglio unit(s) 17 is inactive. The operator bypasses the intaglio unit(s) 17 by creating a web path around the unit(s). This is accomplished by passing the web 11 over rollers that route the web over or under said unit(s). Press motion commands from pushbuttons such as Jog and Run cause no movement within the Intaglio unit(s). Servo motor speed and position information is created using an internal synthesized method.

When combination print mode is selected, the first intaglio unit 17 in the press line generates the motion reference signal. All servo movement is coordinated by this signal. Flexographic unit(s)' servo(s) move in conjunction to the reference signal. The signal is conditioned by parametric data such as print repeat length, web tension set point, and the likes. Software algorithms continuously compute the associated servo commands which, when combined with servo motor digital position feedback, provide precise movement of the servo. It is said that this activity is referred to as an electronic gearbox. The software controls which signals and parameters are needed to effectively maintain registration between each dissimilar unit(s) in the press line. Complex algorithms message the reference signal before passing it on to the specific servo motors. The intaglio unit(s) utilize a "stop-n-go" substrate transport. This mechanism creates an intermittent movement of the web similar to a movie projector. A series of four servos establish the intermittent motion. Since the Flexographic and other units in the, press line require continuous and stable web movement, it is necessary for the "stop-n-go" transport to accept web as continuous flow and deliver web in a continuous flow to the next unit in the line. Each servo drives a pull roller 25 that the web contacts, thus allowing the servo to affect the position of the web. The implementation of the servos is as follows: 1) the first servo pulls web in a continuous manner from the previous unit. Its motion command from the motion controller is based on the reference signal and the parameters associated with web tension settings. It pushes the web into a vacuum box 26, which is used as an accumulator. A vacuum pump insures that adequate vacuum is present to receive web at the speed necessary. 2) The second servo, referred to as shuttle drive #1, pulls web from vacuum box #1 and passes it to the intagilo plate cylinder 27. The command for this servo is based on the reference signal and several other key elements. It is the responsibility of this servo to position the web in register with the image on the intaglio plate. The intaglio, plate is mounted to a cylinder that has a circumference of double the largest Flexo plate cylinder. The intaglio plate cylinder is moving at twice the surface speed as the Flexo plate cylinder(s) so that both make a revolution in the same period of time. The shuttle #1 servo creates an intermittent motion pattern of web so that part of the time the web is stopped while part of the time the web is moving twice the speed as is the other units in the press line. The algorithm that generates the command to the servo uses the reference position to calculate the position of the shuttle 500 times per second. A mark sensor reads registration marks printed by the first unit in the press line to adjust the motion commands to permit perfect registration. It is the registei mark that allows the motion controller to compensate for slippages in the web across rollers, slight elongations in the web, and other artifacts of the printing process. The motion algorithm uses a sine type pattern generator thereby creating a smooth transition from the "web stopped" portion of the cycle to "web moving" portion of the cycle. This sinusoidal pattern of motion is synchronized to the leading edge of the intaglio printing plate by the reference, and its relationship to the registration marks read on the web. Mark register data is collected through direct connection of the mark sensor to the motion controller board(s). 3) The third servo is referred to as shuttle servo #2. This servo accepts web from shuttle servo #1 after printed by the intaglio plate cylinder. The servo's command is identical to that of shuttle servo #1 with one exception: this servo command includes additional parametric data to create a slight difference in position relative to shuttle servo #1. In numerical terms, when shuttle servo #1 moves 1" forward, shuttle servo #2 may move 1.001" forward. This creates a slightly higher web tension while the web undergoes intaglio printing. Parametric data affects the amount of gain in shuttle servo #2. Shuttle servo #2 passes the web to vacuum box #2 (28), which serves as an accumulator as does vacuum box #1. 4) The fourth servo in the transport pulls web from vacuum box #2 and passes it to the next unit in the press line. This servo is running in a continuous motion mode, based on the reference signal. Parametric data establishes the electronic gear ratio so that the web is being delivered to the next unit at the same position and speed as the first servo accepted web from the previous unit on the press line.

Once the web 11 is printed with the intaglio ink, it passes through a forced air dryer 18. A chill unit 19 follows next in the press line, cooling the back to ambient temperature from a highly elevated temperature in the intaglio dryer 38. The web is passed across several chilled rollers 30 in a zigzag pattern. Circulating refrigerated water through the cores chills the rollers. The chilled rollers 30 are driven by a servo motor 35 that receives its command based on the reference and parametric data such as web tension settings. Additional intaglio unit(s) 17 would follow the first intaglio unit, if included. Their operation is identical to that of the first intaglio unit, described above.

As illustrated in FIG. 1B, finishing or processing units follow in the press line. These units may consist of one or more of the following: die cutting unit 33, registered holographic application unit RFID applicator, numbering, or other. Each respective unit would be driven by a separate servo motor 35, which receives its command from the motion controller board(s). These units and their respective servo move the web in a continuous motion, using parametric data to affect registration and tension. Each unit may include a mark sensor to further affect the motion command. Precise registration is obtained when mark sensor data is part of the motion command, as web distortion, elongation, and the likes, become known in the calculations for the command. Likewise, conventional rewinding 37, folding, and/or sheeting apparatus may be included in the press line. Once the web is printed, and other features are added as necessary, the web gets delivered as follows depending on customer requirements: A rewinder 37 accepts web from the previous unit in the press line and winds it onto paper cores. The size of the core and the overall dimension of the finished roll are dependent on the type of rewinder used and customer requirements. Typically, a roll would be wound on a 3 inch core and a 40 inch finish diameter. Rewinders are generally stand-alone units that receive basic run/stop information from the integrated PLC. Folders are driven by a servo motor that receives commands based on the reference and parametric data. A folder delivers the web in a fan folded format, and subsequently gets boxed in 2500 folded documents to a box. A sheeter is driven by a servo motor that receives commands from the motion controller(s) based on the reference signal and parametric data. A mark sensor normally accompanies the controls for a sheeter, as the cut position is a close registration feature. A sheeter accepts web from the previous unit in the press line and cuts the web into a equal length documents that are subsequently boxed by the 500 to 2500 unit count. The cut registration is accurately maintained when a mark sensor is incorporated to read the registration mark printed by the first active unit in the press line.

Software algorithms utilize digital data from devices on each of the units on the press line, incorporate that information with parametric data from the operator, and configuration data that specifies the resolution of each position encoder, the circumference of cylinders and pull rolls, and other machine specific data. It is this data that results in precise commands to each servo in the press that in turn results in accurate movement of the web under all operating conditions. Preferably, each servo has a separate algorithm evaluating the data and issuing commands. Electronic gearing can be thought of as the general activity of each algorithm. Additional computations take dynamics into account that include web stretch, web elongation, and other web distortions. In the case of the intaglio unit(s) 17, the shuttle roller 39 movement is based on a profile, or cam pattern. It's commanded position is continuously modified by position mark sensor data The press operator adjusts parameters on the graphics display that results in web tension changes, as required by various substrate types. Algorithms adjust the servos commands so that the respective servo runs slightly slower or faster than the previous unit.

Glossary:

Prewipe unit: Used in conjunction with intaglio printing. An inking unit applies ink to the intaglio printing plate. The prewipe unit contacts the plate next for the purpose of removing excess ink from the printing plate. A typical configuration of a prewipe unit would include the prewipe roller, a doctor roller, and a doctor blade. The doctor roller removes the ink from the prewipe roller, and the doctor blade removes ink from the doctor roller. The removed ink is collected in a recovery system for either disposal or recycling.

Reference: This is the signal that orchestrates the movement of servos in the press line. It can be thought of in the same way as a conductor in an orchestra.

Registration: The alignment of multiple features to a substrate. An example is the alignment of two separate colors on a web. Another would be the alignment of printing on the web to that of a die cutting unit.

Servo motor: Refers to a high precision variable speed motor. Servos possess the ability to maintain precise speeds, accelerate or decelerate loads in a fraction of a second. Web: The stream of paper or other substrate that spans the length of the press is the web. It starts at the unwinder, pulled from a roll, and extends to the delivery end of the press where it is either rewound into a roll, cut into sheets, or folded.

Wiping System: Part of an Intaglio print unit, the unit removes excess ink from the engraved printing plate. An intaglio inker applies ink to areas of a printing plate. The wiping system removes all ink from the surface of the plate thus leaving in only the engravings on a plate. When a prewipe system is included, it tends to reduce the load on the wiping system by taking a preliminary wipe on the plate. Wiping systems come in two forms, and are vastly different from each other. They are: 1) Water wipe system. A water wipe system utilizes a rubber covered roller that contacts the printing plate, rotating so that its surface is moving in the opposite direction as the plate cylinder. This effectively rubs the ink off the surface of the printing plate. Once the ink is collected on the wiping cylinder, it later comes in contact with cleaning solution, brushes, and a doctor blade. The process of wiping and cleaning is ongoing. The cleaning solution carries the excess ink away which is disposed in a separate process. 2) A paper wipe system removes ink similarly to the extent that the wiping roller is used to press paper against the plate, using the same opposite direction movement. In this system, the ink is carried away on the paper, which starts at an unwinder, runs across the wiping roller, then rewound onto a paper core.

The press 10 utilizes three separate software programs (Appendix), each running on it's own processor 40, 44, 45. An industrial PC 40 runs the host software with two RISC processor based motion control boards 44,45 plugged into the industrial PC back plane. The industrial PC 40 acts as the host to coordinate the activities of itself and the motion control processors 44, 45. Operator interaction takes place through the host processor through the use of color graphic screen information and input through a keyboard/mouse combination or a touch screen. The motion control processors 44, 45 interpret commands from the host 40 via the PC back plane and carry out the activity of managing the machine motion throughout the press 10.

The first motion control processor 44 manages the activities of the intaglio unit 17 including the stop and go web transport. It also generates timing signals that one or more other motion control processors 45 utilize to synchronize web motion so as to maintain web tension and registration.

When the press 10 is operated in the combination mode where the intaglio printing is taking place in conjunction with the flexo printing and possibly other features on the press, the following process is utilized to manage motion: 1) The operator initiates a command to run the press via a run pushbutton; 2) the run command is interpreted by the host 40, and subsequently passes the command on to the first motion processor 44; 3) the first motion processor 44 enables the main drive 22 on the intaglio unit 17 and sends it a speed command; 4) the intaglio gear train, coupled with the main printing cylinder 27, rotates at the preset speed, which in turn causes the mechanically coupled reference encoder 21 to rotate; 5) the signal from the reference encoder is fed to the first motion processor 44; 6) the value of the reference encoder provides a binary number that points to a lookup table in the processor 44 signifying the position of each of the servo motors used to position of the web 11; 7) the values in the lookup table are adjusted both statically when the press is calibrated and dynamically as a result of reading information about the web 11 on an ongoing basis via registration mark sensors and web tension sensors (the location of each of the sensors is dependant on the press configuration and may or may not exist depending on the press configuration); 8) the first motion processor 44 also distributes the value of the reference encoder in real time across the PC back plane to the other motion processor(s) 45; 9) the other motion processor(s) 45 adjust the position of their respective servo motors based on their respective lookup tables.

When the press is operated without the intaglio unit 17, the first motion processor 44 generates a synthesized reference encoder signal that it uses and distributes to the other motion control board 45. In this case, the sequence of activity matches that of the combination mode with the following exceptions: 1) the host run and speed command is converted to the synthesized signal rather than generating the enable and speed commands to the intaglio main drive.

The invention claimed is:

1. A web fed printing press comprising:

at least one flexographic printing module equipped to apply variable amounts of motion and tension to a web substrate;

at least one intaglio printing module equipped to apply variable amounts of motion and tension to said web substrate; and means for controlling the amounts of motion and tension applied by the flexographic printing module and by the intaglio printing module to said web substrate, wherein the at least one flexographic printing module and the at least one intaglio printing module are arranged so that flexographic and intaglio printing can occur simultaneously on a web substrate.

2. The web fed printing press according to claim 1, wherein said means for controlling the amounts of motion and tension applied to said web substrate by said at least one flexographic printing module and by said at least one intaglio printing module comprises a host processor and first and second motion control processors.

3. The web fed printing press according to claim 2, wherein the first motion control processor controls the amounts of motion and tension imparted to the web substrate by the intaglio printing module.

4. The web fed printing press according to claim 2, wherein said first motion control processor generates a plurality of timing signals and the second motion control processor utilizes tuning signals to control the amounts of motion and tension imparted to the web substrate by the flexographic printing module.

5. The web fed printing press according to claim 2, wherein the means for controlling the amounts of motion and tension applied by the intaglio printing module to said web substrate further comprises a reference encoder, said reference encoder generating a reference signal corresponding to the motion of said web substrate.

6. The web fed printing press according to claim 5, wherein the first motion control processor utilizes the reference signal generated by thereference-controller to control the amounts of motion and tension imparted to the web substrate by the intaglio printing module.

7. The web fed printing press according to claim 1, wherein said means for controlling the amounts of motion and tension applied by the flexographic printing module and by the intaglio printing module to said web substrate further comprises at least one servo motor on said at least one intaglio printing module and at least one servo motor on said at least one flexographic printing module.

8. The web fed printing press according to claim 7, wherein said at least one servo motor on said at least one intaglio printing module is mechanically connected to said web substrate and electrically connected to said first motion control processor.

9. The web fed printing press according to claim 7, wherein said at least one servo motor on said at least one flexographic printing module is mechanically connected to said web substrate and is electrically connected to said second motion control processor.

10. The web fed printing press according to claim 2, wherein said first motion control processor is mounted in a first RISC based motion control board and said second motion control processor is mounted in a second RISC based motion control board.

11. The web fed printing press according to claim 1, wherein said at least one flexographic printing module precedes said at least one intaglio printing module.

12. The web fed printing press according to claim 1, wherein means for bypassing said at least one intaglio printing module are provided.

13. The web fed printing press according to claim 12, wherein said means for bypassing said at least one intaglio printing module comprises a synthesized reference signal, said synthesized reference signal being utilized by a motion control processor to control the amounts of motion and tension imparted to the web substrate by said at least one flexographic printing module.

14. The web fed printing press of claim 1 wherein the at least one flexographic printing module and the at least one intaglio printing module are arranged so that, during operation of the web fed printing press, the web substrate passes through the at least one flexographic printing module before passing through the at least one intaglio printing module.

15. The web fed printing press of claim 14 wherein the web substrate's motion through the at least one flexographic printing module is substantially continuous and wherein the web substrate's motion through the at least one intaglio printing module is intermittent.

16. The web fed printing press of claim 15 further comprising:

at least one servo arranged to move the web substrate through the at least one flexographic printing module; and at least one servo arranged to move the web substrate through the at least one intaglio printing module.

17. The web fed printing press of claim 16 wherein the intaglio printing module comprises:

an intaglio plate cylinder;

a first servo arranged to pull the web substrate from the at least one flexographic printing module in a continuous manner;

a first vacuum box arranged to receive the web substrate from the first servo;

a second servo arranged to transport the web substrate from the first vacuum box to the intaglio plate cylinder;

a third servo to pull the web substrate from the intaglio plate cylinder;

a second vacuum box arranged to receive the web fed substrate from the third servo; and a fourth servo to pull the web substrate from the second vacuum box in a substantially continuous manner.

18. The web fed printing press of claim 17 wherein the second and third servos are operable relative to one another to create tension in the web substrate at the intaglio plate cylinder.

19. The web fed printing press of claim 16 further comprising:

an optical encoder coupled to the intaglio unit and adapted to generate a motion reference signal; and a motion controller to control the at least one servo arranged to move the web substrate through the at least one flexographic printing module and the at least one servo arranged to move the web substrate through the at least one intaglio printing module, wherein the motion controller controls based, at least in part, on the motion reference signal.

20. The web fed printing press of claim 1 wherein the at least one flexographic printing module and the at least one intaglio printing module are arranged so that flexographic and intaglio printing can occur at different times on the web substrate.

21. A web fed printing press comprising:

at least one flexographic printing module;

at least one intaglio printing module;

a controller to control motion of a web substrate through the flexographic printing module and the intaglio printing module, wherein the at least one flexographic printing module comprises at least one servo to move the web substrate through the at least one flexographic printing module in a continuous manner;

wherein the at least one intaglio printing module comprises:

an intaglio plate cylinder;

a first servo arranged to pull the web substrate from the at least one flexographic printing module in a continuous manner;

a first vacuum box arranged to receive the web substrate from the first servo;

a second servo arranged to transport the web substrate from the first vacuum box to the intaglio plate cylinder using intermittent motion;

a third servo to pull the web substrate from the intaglio plate cylinder, wherein the third servo is operable relative to the second servo to create tension in the web substrate at the intaglio plate cylinder;

a second vacuum box arranged to receive the web fed substrate from the third servo; and a fourth servo to pull the web substrate from the second vacuum box in a substantially continuous manner;

wherein the at least one flexographic printing module and the at least one intaglio printing module are arranged so that flexographic and intaglio printing can occur simultaneously on a web substrate.

* * * * *